United States Patent [19]

Igari et al.

[11] Patent Number: 4,858,667
[45] Date of Patent: Aug. 22, 1989

[54] METHOD FOR COUPLING TUBED TIRE WITH WHEEL

[75] Inventors: Naoto Igari, Fujisawa; Noriyuki Yamamoto, Hatano; Tetshin Sakata, Tokyo, all of Japan

[73] Assignee: Nissan Motor co., Ltd., Yokohama, Japan

[21] Appl. No.: 143,890

[22] Filed: Jan. 14, 1988

[30] Foreign Application Priority Data

Jan. 22, 1987 [JP] Japan .................................. 62-13090

[51] Int. Cl.$^4$ ............................................. B60C 25/00
[52] U.S. Cl. ....................................... 157/1.1; 157/1.0
[58] Field of Search ...................................... 157/1, 1.1

[56] References Cited

U.S. PATENT DOCUMENTS 4,223,386 9/1980 Maruyama et al. .

FOREIGN PATENT DOCUMENTS 0102709 8/1980 Japan ..................................... 157/1.1
236809 11/1985 Japan ..................................... 157/1.1
2067140 7/1981 United Kingdom .

*Primary Examiner*—Debra Meislin
*Attorney, Agent, or Firm*—Pennie & Edmonds

[57] ABSTRACT

Herein disclosed in a method for coupling a tubed tire with a wheel assuring a dynamically balanced coupling therebetween. The tube has an inflation valve and the wheel has a valve aperture. The method comprises in steps finding and marking a first portion of the wheel where the radial run-out value (RR) is the minimum and a second portion of the tire proper where the radial force variation value (RFV) is the maximum, disposing the tube in the tire proper, sliding the tube within the tire proper to a position where an angular position of the second portion relative to the inflation valve is equal to that of the first portion relative to the valve aperture, and coupling the tubed tire with the wheel having the inflation valve passed through the valve aperture.

4 Claims, 3 Drawing Sheets

POSITION OF VALVE APERTURE

METHOD FOR COUPLING TUBED TIRE WITH WHEEL

BACKGROUND OF THE INVENTION

1. Field of the Invention

The present invention relates in general to a method for assemling a wheel assembly (viz., tire-mounted wheel), and more particularly to a method for coupling a tubed tire with a wheel.

2. Description of the Prior Art

Among tires for vehicles, there are tires of a tubed type which comprises a discrete external covering of rubber (which will be referred to as a tire proper in the following) and an inflated tube coaxially disposed in the tire proper. The tube has at its radially inner side an inflating valve which projects inwardly and then axially outwardly therefrom. Upon practical use, the tubed tire is tightly mounted on a rim of a wheel having the inflating valve passed through a valve aperture formed in the rim. With this coupling process, a so-called tired wheel is provided.

In order to achieve a balanced rotation of the tired wheel thus assembled, respective dynamical natures, viz., uniformities, of the tubed tire and the wheel are checked before coupling of the tubed tire and the wheel. That is, the coupling therebetween is so made that the respective dynamical natures of them are cancelled from each other. Usually, with an aid of a uniformity tester, the radial force variation (RFV) of the tubed tire (viz., the variation of force applied in a radial direction of the tire) and the radial run-out (RR) of the wheel (viz., the radial vibration of the wheel rim) are measured to find out their maximum and minimum value points and put marks on these points on the tubed tire and the wheel rim. The coupling is then carried out in a manner to match the position of the mark representative of the maximum value point on the tubed tire with the position of the mark representative of the minimum value point on the wheel rim, or vice versa.

However, hitherto, the proper or matched coupling of the tubed tire and the wheel has been very difficult or at least troublesome because of the following reasons.

As is seen FIG. 4, during the coupling step, the inflating valve 3 of the tube 2 is put through a valve aperture 5 of the wheel rim 4. Upon this, the relative positioning between the tube 2 in the tire 1 and the wheel rim 4 is unconditionally decided. That is, coaxial displacement of the tube 2 relative to the wheel rim 4 is no longer permitted. Thus, for matching the position of the maximum or minimum value mark 6 on the tire 1 with the position of the minimum or maximum value mark 7 on the wheel rim 4, it is necessary to slide the tire 1 relative to the tube 2. However, this sliding of the tire 1 requires a great force due to a considerable friction generated between the tire 1 and the inflated tube 2.

One measure for solving this drawback is to form the valve aperture 5 after the matched coupling of them. However, this measure can not be used in wheels 8 and 9 of a deeper rim type and a side ring rim type as illustrated in FIGS. 5 and 6 respectively. In the deeper rim type wheel, the valve apeture 5 is formed in a side wall 4b of an groove 4a of the rim 4, and in the side ring rim type wheel, the valve aperture 5 is formed in a center of a bottom 4c of the rim 4. However, neither of them can prepare a working space for receving or setting therein punching tools, such as a die 10 and a punch 11 as shown in FIG. 7. That is, in the wheel 8 of FIG. 5, the size of a space $S_1$ defined between the rim 4 and a swelled portion of a disc 12 is insufficient for setting therein the die 10 or the punch 11, and also in the wheel 9 of FIG. 6, the side of a space $S_2$ defined between the rim 4 and a depressed portion 12a of the disc 12 is too small.

FIG. 8 shows another side ring rim type wheel 9a in which the disc 12 is secured to a side edge portion of the rim 4. Because no obstruction is present around the bottom 4c of the rim 4, formation of the valve aperture 5 in the rim bottom 4c is readily effected. However, in this wheel 9a, it becomes necessary to provide the disc 12 with another aperture 12b through which the inflating valve 3 is projected into the open side of the wheel 9a. Of course, the formation of such another aperture is troublesome.

SUMMARY OF THE INVENTION

It is therefore an object of the present invention to provide a method for coupling a tubed tire with a wheel assuring the dynamically balanced coupling therebetween, which method is free of the above-mentioned drawbacks.

According to the present invention, there is provided a method for coupling a tubed tire with a wheel, which is very easy as compared with the conventional coupling method.

According to the present invention, there is provided a method for coupling a tubed tire with a wheel. The tube in the tire proper has an inflation valve projected therefrom and the wheel has a valve aperture formed in a rim of the same. The method comprises, in steps (a) subjecting the wheel to a uniformity test to find out and mark a first certain portion of the wheel where the radial run-out value is the minimum; (b) defining the position of the first certain portion by using a first central angle which is defined between a line passing through the first certain portion and a center of the wheel and another line passing through the valve aperture and the wheel center; (c) subjecting only the tire proper to a uniformity test to find out and mark a second certain portion of the tire proper where the radial force variation value is the maximum; (d) disposing the tube in the tire proper; (e) defining the position of the second certain portion by using a second central angle which is defined between a line passing through the second certain portion and a center of the tire and another line passing through the inflation valve and the tire center; (f) sliding the tube in the tire proper to a position where the second central angle of the tubed tire is equal to the first central angle of the wheel; and (g) coupling the tubed tire with the wheel having the inflation valve passed through the valve aperture.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, an improved method according to the present invention will be described in detail with reference to FIGS. 1 to 3. For ease of understanding, the description will be directed to an example in which a side ring rim type wheel 20, as shown in FIG. 1, is used.

Figure 1:
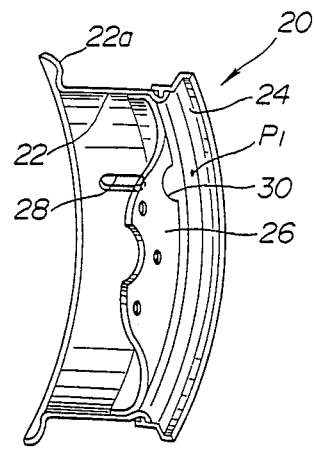
FIG. 1 is a partially broken perspective view of a part of a wheel, illustrated for depicting a first process of the method of the present invention.
Figure 2:
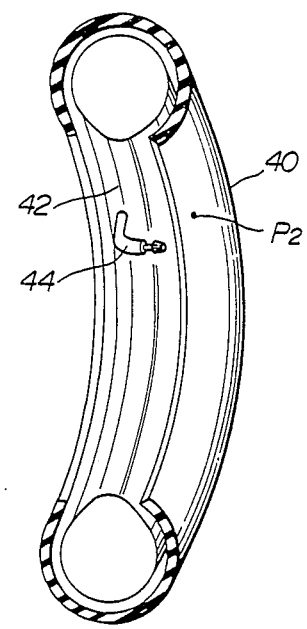
FIG. 2 is a partially broken perspective view of a part of the tubed tire, illustrated for depicting a second process of the method of the present invention.

The side ring rim type wheel 20 illustrated in FIG. 1 comprises a rim 22 having at its inboard side an annular flange portion 22a integrated therewith. A side ring 24 is secured to an outboard side of the rim 22 to form another annular flange portion. A disc 26 is secured at its peripheral edge to the outboard side of the rim 22. The disc 26 is adapted to be bolted to a wheel hub (not shown). Designated by numeral 28 is a valve aperture formed in the rim 22, and 30 is another aperture formed in a peripheral portion of the disc 26. Upon coupling, an inflation valve 44 (see FIG. 2) of a tube 42 in a tire 40 is passed through these apertures 28 and 30 and exposed to the outside of the wheel 20.

In the coupling method according to the present invention, the following two processes are independently carried out before the coupling of the tubed tire 40 with the wheel 20.

In the first process, the wheel 20 is subjected to a rotation test by using a known uniformity tester to measure the radial run-out (RR) of the wheel 22 (viz., the radial vibration of the wheel rim 22 under rotation). With this test, a certain portion $P_l$ of the rim 22 where the radial vibration degree has been the minimum is found and marked. The position of the portion $P_l$ can be thus represented by a central angle defined between a line passing through the portion $P_l$ and a center of the wheel 20 and another line passing through the valve aperture 28 and the wheel center. The detail of the uniformity test is described in "Automotive Engineering Volume 12 titled "Tire & Brake" (issued from SANKAIDO on January 20, 1970)". That is, a waveform provided for one rotation of the wheel 20 is expanded in Fourier series to express the same as a sinusoidal wave having N'nd component. In accordance with the present invention, the vibration of the rim 22 is analyzed by using a primary component of the waveform because the primary component is clear and strong.

Figure 3:
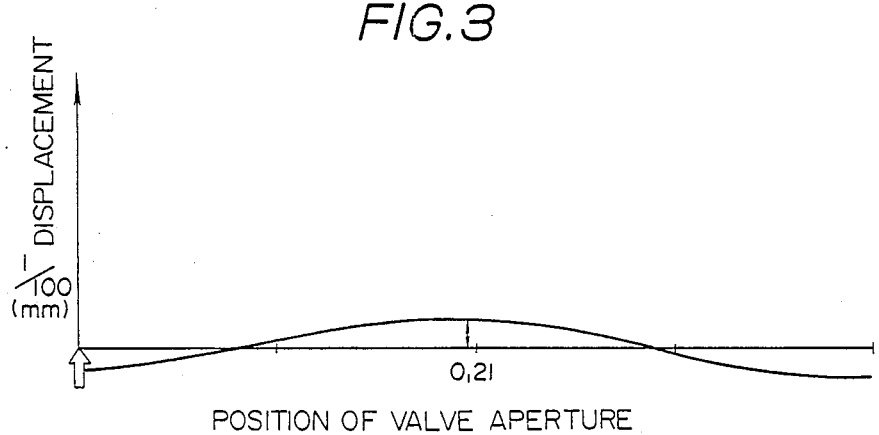
FIG. 3 is a graph showing a characteristic of a primary component of a radial vibration exhibited by the rim of the wheel of FIG. 1.
Figure 4:
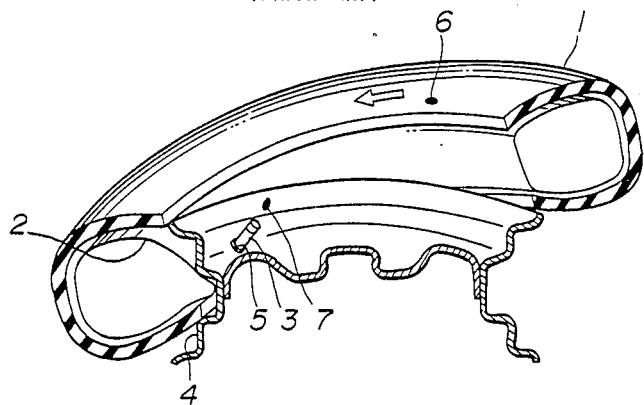
FIG. 4 is a partially broken perspective view of a part of a tired wheel, illustrated for depicting a conventional method for coupling a tubed tire with a wheel.

FIG. 3 shows one of the primary component waveforms of the rim vibration which were obtained from the test carried out by the inventors.

In the test, ten wheels of a side ring rim type were subjected to rotation examination. All of the wheels showed substantially the same waveforms as the waveform of FIG. 3 and showed that the position $P_1$ where the radial vibration degree had been the minimum was the position where the valve aperture 28 was provided.

According to this test, it was understood that valve aperture 28 and the other aperture 30 should be positioned at the same zone or at least close to each other, as is seen from FIG. 1. The position of the mark $P_1$ was thus substantially zero when represented in terms of the above-mentioned central angle.

In the second process, only the tire 40 (viz., the tire 40 without the tube 42) is subjected to a rotation test by using a known uniformity tester to measure a radial force variation (RFV) thereof. With this test, a certain portion $P_2$ of the tire proper 40 where the RFV has been the maximum is found out and marked. Then, the tube 42 is put in the tire proper 40 and inflated to such a level as to permit a sliding movement of the tube 42 relative to the tire proper 40. Thus, in this condition, like in the case of the wheel 20, the position of the mark $P_2$ can be respresented by a central angle defined between a line passing through the mark $P_2$ and a center of the tire 40 and another line passing through the inflation valve 44 and the tire center. Then, the tube 42 is slided in the tire proper 40 to a position where the central angle defined between the mark $P_2$ and the valve 44 is equal to the afore-mentioned central angle defined between the mark $P_1$ and the valve aperture 28 of the wheel 20.

Then, the tubed tire 40 (viz., the tire 40 having the tube 42 housed therein) is coupled with the wheel 20 having the inflation valve 44 passed through the apertures 28 and 30 of the wheel 20, and then, the tube 42 is fully inflated. Upon completion of the wheel assembly, the positions of the marks $P_1$ and $P_2$ are automatically matched for the reason which will be easily understood from the foregoing description.

In fact, since the angular position of the mark $P_1$ on the wheel 20 is zero relative to the valve aperture 28, the mark $P_2$ and the inflation valve 44 of the tubed tire 40 are to be placed at the same zone or at least close to each other. This means that, in the second process, the tube 42 is slided to the position where the inflation valve 44 of the tube 42 faces the mark $P_2$ as shown in FIG. 2. That is, upon assembly of the wheel assembly (20+40), the valve aperture 28 and the mark $P_1$ of the wheel 20 and the inflation valve 44 and the mark $P_2$ of the tubed tire 40 are placed at a same zone of the wheel assembly mutually cancelling the inherent natures of them.

Figure 5:
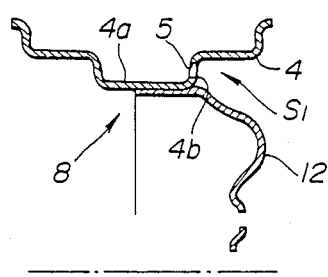
FIG. 5 is a sectional, but partial, view of a deeper rim type wheel.
Figure 6:
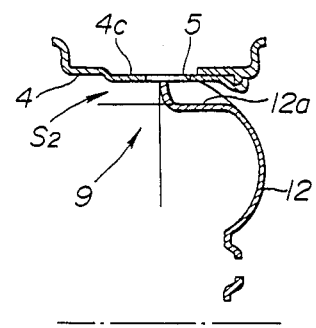
FIG. 6 is a view similar to FIG. 5, but showing a side ring rim type wheel.
Figure 7:
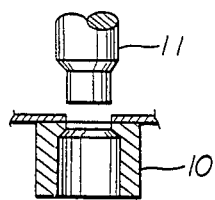
FIG. 7 is a sectional view of punching tools.
Figure 8:
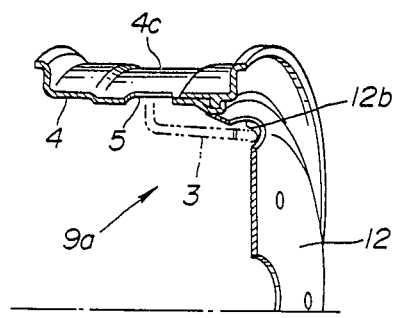
FIG. 8 is a partially broken perspective view of a part of another side ring rim type wheel.

Although the foregoing description is directed to the example wherein the side ring rim type wheel as shown in FIG. 1 is employed, the method according to the present invention is also applicable to other example wherein a deeper rim type wheel as shown in FIG. 5 or an inclined rim type wheel (not shown) is employed.

Furthermore, although the above description is directed to the example wherein the primary component of the waveform is used for ananyzing the radial vibration of the wheel rim, it is also possible to use the other components, such as secondary component and the like.

As will be understood from the foregoing description, in the assembling method according to the present invention, the matched coupling of a tubed tire with a wheel can be readily effected by only matching the position of the inflation valve of the tube with the position of the mark $P_2$ (viz., the maximum value point of RFV of the tire proper 40) before the coupling.

What is claimed is:

1. A method for coupling a tubed tire with a wheel, the tube in the tire proper having an inflation valve projected therefrom and said wheel having a valve aperture formed in a rim of the same, said method comprising, in steps:

(a) subjecting said wheel to a uniformity test to find out and mark a first certain portion of the wheel where the radial run-out value is the minimum;
(b) defining the position of the first certain portion by using a first central angle which is defined between a line passing through said first certain portion and a center of said wheel and another line passing through said valve aperture and the wheel center;
(c) subjecting only the tire proper to a uniformity test to find out and mark a second certain portion of the tire proper where the radial force variation value is the maximum;
(d) disposing the tube in the tire proper;
(e) defining the position of the second certain portion by using a second central angle which is defined between a line passing through said second certain portion and a center of the tire and another line passing through said inflation valve and the tire center;
(f) sliding the tube in the tire proper to a position where the second central angle of the tubed tire is equal to the first central angle of the wheel; and
(g) coupling the tubed tire with the wheel having the inflation valve passed through the valve aperture.

2. A method as claimed in claim 1, in which said wheel is of a side ring rim type which comprises:
   a rim having at its inboard side an annular flange portion integrated therewith;
   a side ring secured to an outboard side of the rim to form another annular flange portion; and
   a disc secured at its peripheral edge to the outboard side of the rim, wherein said rim has said valve aperture formed therethrough.

3. A method as claimed in claim 2, in which said disc has an aperture through which said inflation valve expending from said valve aperture is passed to be exposed to the outside of said wheel.

4. A method as claimed in claim 1, in which said radial run-out value is obtained by using a primary component of the waveform of a radial vibration of the rim of the wheel.

* * * * *